United States Patent
Berke et al.

(10) Patent No.: US 7,927,418 B2
(45) Date of Patent: Apr. 19, 2011

(54) COORDINATED METAL COMPOUNDS FOR REDUCING CHROMIUM

(75) Inventors: Neal S. Berke, Chelmsford, MA (US); Leslie A. Jardine, Burlington, MA (US); Vijay Gupta, Woburn, MA (US); Charles R. Cornman, Huntington Beach, CA (US); Antonio J. Aldykiewicz, Jr., Lexington, MA (US); Urszula B Latosiewicz, Arlington, MA (US); Felek Jachimowicz, Brookline, MA (US); Durga Subramanian, Lexington, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 84 days.

(21) Appl. No.: 12/376,919

(22) PCT Filed: Aug. 9, 2007

(86) PCT No.: PCT/US2007/075602
§ 371 (c)(1),
(2), (4) Date: Apr. 3, 2009

(87) PCT Pub. No.: WO2008/021966
PCT Pub. Date: Feb. 21, 2008

(65) Prior Publication Data
US 2010/0162925 A1    Jul. 1, 2010

Related U.S. Application Data

(60) Provisional application No. 60/837,454, filed on Aug. 11, 2006.

(51) Int. Cl.
*C04B 22/00*    (2006.01)

(52) U.S. Cl. .............. 106/713; 106/727; 106/823
(58) Field of Classification Search .............. 106/713, 106/727, 823
See application file for complete search history.

(56) References Cited

U.S. PATENT DOCUMENTS

| | | |
|---|---|---|
| 4,401,472 A | 8/1983 | Gerber |
| 4,784,691 A | 11/1988 | Rasmussen |
| 5,084,103 A | 1/1992 | Myers et al. |
| 6,290,772 B1 | 9/2001 | Cheung et al. |
| 6,645,289 B2 | 11/2003 | Sobolev et al. |
| 2003/0167973 A1 | 9/2003 | Peev et al. |

FOREIGN PATENT DOCUMENTS

| | | |
|---|---|---|
| JP | 6100343 | 4/1994 |
| JP | 2003-306365 | 10/2003 |

OTHER PUBLICATIONS

A.M. Cody, et al. The effects of chemical environment on the nucleation, growth, and stability of ettringite [Ca3Al(OH)6]2(SO4)3•26H2O, Cement and Concrete Research 34 (2004) 869-881.

K. L. Cheng, "Precipitation of Cuprous Hydroxide by Ferrous Ethylenediamine Tetraacetate", Anal. Chem., 1955, 27 (7), 1165-1166.

International Preliminary Report on Patentability for International Application No. PCT/US2007/075602 dated Feb. 17, 2009, 4 pages.

*Primary Examiner* — Paul Marcantoni
(74) *Attorney, Agent, or Firm* — Craig K. Leon; Stephan P. Williams

(57) ABSTRACT

Methods and compositions involving the use of nitrogen-containing coordinated metal compounds for stabilizing chromium VI reducing metal cations. Exemplary uses include processes for making cement, and exemplary compositions include cement additives, concrete admixtures, as well as hydratable cement and cementitous compositions.

15 Claims, 5 Drawing Sheets

US 7,927,418 B2

COORDINATED METAL COMPOUNDS FOR REDUCING CHROMIUM

This is a Section 371 application based on International Application No. PCT/US2007/075602 filed Aug. 9, 2007, which claims priority to U.S. Provisional Application No. 60/837,454 filed Aug. 11, 2006.

FIELD OF THE INVENTION

This invention relates to compositions and methods for reducing hexavalent chromium, and more particularly to the use of coordinated metal compounds wherein at least two nitrogen containing moieties or groups, such as ethylenediamine ferrous (Iron II) salt, are used for reducing chromium VI, in various applications, and especially in making or using hydratable cement and cementitious compositions.

BACKGROUND OF THE INVENTION

Chromium is an unavoidable trace element of the raw material used in the manufacture of cement, which is interground to produce hydratable cement. In the oxidizing and alkaline burning conditions of the cement kiln, hexavalent chromium (VI) may form. Hexavalent chromium is a powerful dermal irritant that is considered extremely toxic due to hits high oxidation potential and ability to penetrate human tissue. It can cause skin sensitization, allergic reactions, and eczema.

Hexavalent chromium has high solubility in water, and is released when cement is mixed with water. Thus, wet cement poses a health issue for workers who come into contact with wet cement or concrete.

A typical approach is to employ ferrous (iron II) sulfate to reduce hexavalent chromium (VI) to trivalent chromium (III), which tends to precipitate from solution, thereby reducing its risk as a dermal irritant.

However, ferrous sulfate has poor dosage efficiency in reducing chromium VI to chromium III. It has perhaps ten times the stoichiometric requirement when compared to stannous sulfate, another chromium reducer used during cement manufacturing. The poor dosage efficiency of ferrous sulfate is explained partly by the fact that it readily oxidizes from Iron (II) to Iron (III) during prolonged contact with air and water. The ferrous ion is known to react rapidly with oxygen to form ferric ion under alkaline conditions. (See e.g., Cotton, F. A.; Wilkinson, G., *Comprehensive Inorganic Chemistry*, 4th Ed., John Wiley and Sons, 1980, p 490.)

The high temperature and humidity levels of cement manufacturing plants especially render the ferrous sulfate highly susceptible to oxidative attack by atmospheric oxygen. Hence, plant operators sometimes use up to three times the amount of ferrous sulfate otherwise needed for reducing levels of chromium VI. They must also use their ferrous sulfate inventory quickly, due to its lack of storage stability, or it may become useless in short time.

U.S. Pat. No. 4,784,691 taught that one can protect the chromium-reducing ability of ferrous sulfate by coating particles with an oxidation-preventing material. However, this step introduces additional costs. It also does not decrease the dosage requirement to reasonable levels. This patent suggested, in Example 1, that up to thirty times the stoichiometric amount of ferrous sulfate would be required for dosage into cement.

Using large amounts of ferrous sulfate in cement to reduce hexavalent chromium levels creates a number of problems. When used in excess of 0.5 percent based on weight of the cement, ferrous sulfate tends to increase water demand and cement setting time. When used in dry powder form and in large amounts, ferrous sulfate is difficult to interblend uniformly within the cement, thereby exacerbating dosage inefficiency problems.

In view of these concerns, novel methods and compositions are needed for reducing hexavalent chromium levels during the manufacturing of cement and for use generally in hydratable cementitious compositions.

SUMMARY OF THE INVENTION

In minimizing the disadvantages of the prior art, the present invention provides novel compositions and methods for reducing hexavalent chromium (VI) levels, through the use of at least two nitrogen-containing moieties coordinated with the same chromium VI reducing metal cation, thereby stabilizing the metal cation from oxidative attack by atmospheric oxygen as well as minimizing loss of efficiency due to adsorption on cement.

The phrase "chromium VI reducing" is intended to refer to metals in their lower oxidation states, and this in turn refers to their ability to reduce chromium VI to chromium III. For example, such metals include Iron II (Fe II), cobalt II (Co II), and others as described hereinafter.

Preferred embodiments of the at least two nitrogen-containing moieties are polydentate polyamine metal compounds. Such coordinated metal compounds are formed by combining a polydentate polyamine ligand with the metal salt or cation. Methods of the invention involve placing the coordinated metal compound into an environment in which chromium VI is present (e.g., cement) or is to be presented (e.g., dry cement or clinker to be ground into cement).

An especially preferred polydentate polyamine metal compound suitable for use in the present invention is ethylenediamine ferrous sulfate ($C_2H_8N_2 \cdot FeSO_4 \cdot H_2SO_4 \cdot 4H_2O$). The bidentate ligand of the ethylenediamine group ($H_2N-CH_2CH_2-NH_2$) is highly illustrative of the workings of the invention. The ligand has at least two spaced-apart amine groups that, through their pairs of two-electron donor moieties, provide two points of attachment for bonding or associating with the chromium reducing metal cation, which in this case is the ferrous (iron II) cation. The structure is akin to a claw (or chelate) that grasps the metal cation between two or more donor atoms.

Bonding or associating the metal cation with two or more diamine groups preserves the chromium reducing ability of the metal cation, so that compounds containing the metal cation can be blended with cement and stored for months until use. When the cement is later mixed with water, and chromium VI is thus presented into the aqueous environment of the fresh cement, the metal cation remains operative to reduce chromium VI into the much less harmful chromium III form.

The present inventors suspect that the use of coordinated metal compounds of the invention make it less likely for the chromium VI reducing metal cation to be absorbed onto the cement particle itself, such that a further decrease in dosage efficiency is avoided.

The present invention thus provides novel compositions and methods, wherein a coordinated metal compound comprising at least two nitrogen containing moieties complexed or associated with the same chromium VI reducing metal is combined with cement.

An exemplary method of the invention for reducing hexavalent chromium in cementious compositions thus comprises introducing a coordinated metal compound, having at least two amine containing moieties complexed or associated with the same chromium VI reducing metal, is introduced into an environment having chromium VI. An example is a dry hydratable cement, either before, during, or after water is added to initiate hydration thereof.

A preferred method involves adding the coordinated metal compound before or during the intergrinding process by which cement clinker is interground to make cement. The compound may also be incorporated into cement after grinding. Thus, it can be added during classification, or even before shipment from the cement manufacturing plant. It is further possible to blend the compound with cement at a later stage, as in a mixer used for making mortar or concrete.

In other exemplary embodiments, the coordinated metal compound may also be combined with one or more cement additives and/or concrete admixtures, or mixtures thereof, before combining with the cement.

Thus, exemplary compositions of the present invention comprise: (A) a coordinated metal compound wherein at least two amine groups are bonded or associated with the same chromium VI reducing metal; and (B) at least one material selected from (i) a hydratable cement, (ii) at least one cement additive, (iii) at least one concrete admixture, or (iv) a mixture or mixtures thereof. Examples of suitable cement additives and concrete admixtures which may be used in the invention are provided in the following detailed description of preferred embodiments.

The coordinated metal compounds should preferably not be used in combination with lignosulfonates due to the high level of impurities therein which can adversely the cement. Such coordinated metal compounds are thus preferably non-lignosulfonate-based.

Other advantages, benefits, and features of the invention are described in further detail hereinafter.

BRIEF DESCRIPTION OF DRAWINGS

Further advantages and features of the present invention may be more readily comprehended particularly when the following detailed description of preferred embodiments is taken in conjunction with the appended drawings wherein.

DETAILED DESCRIPTION OF PREFERRED EMBODIMENTS

Figure 1:
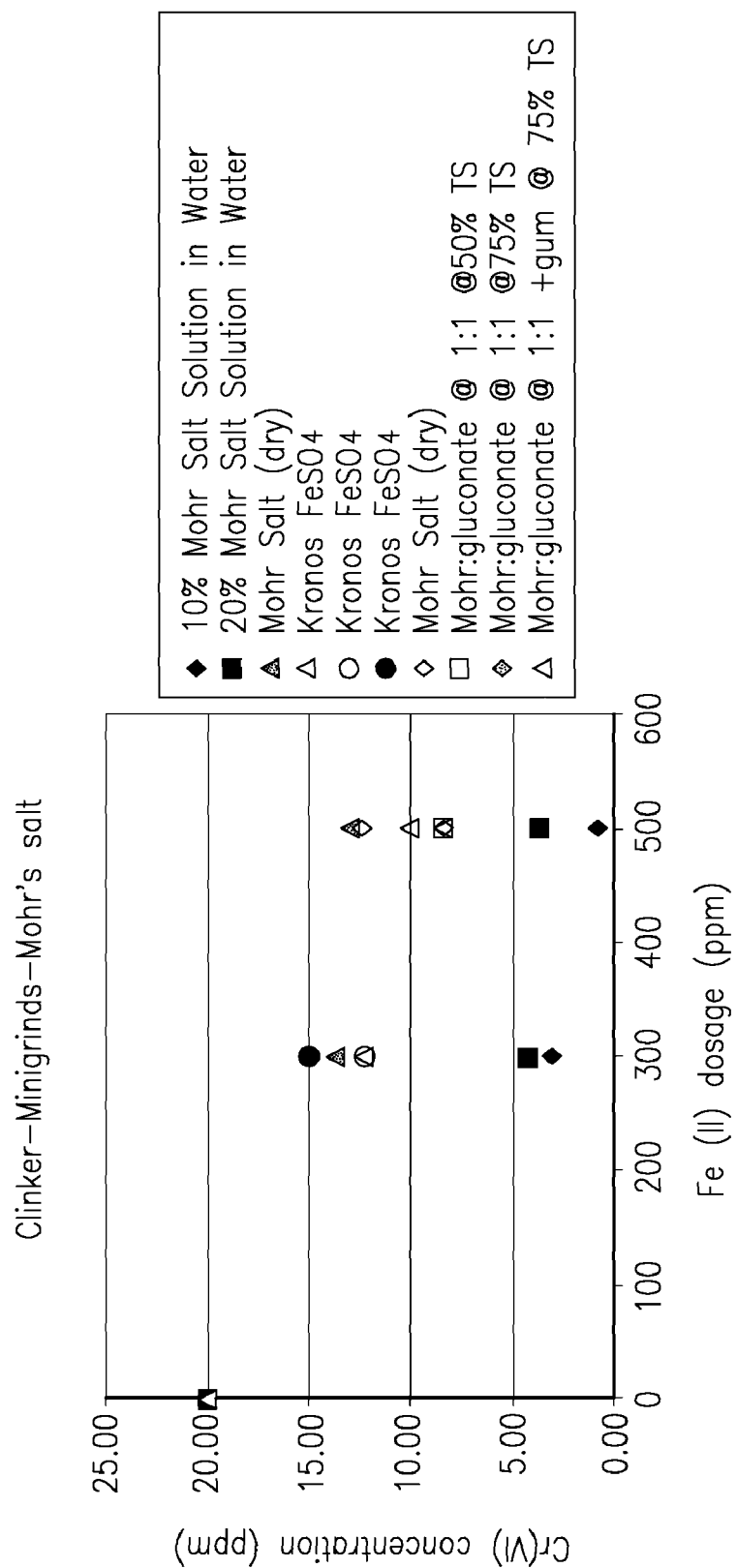
FIG. 1 is a graph of data showing the chromium VI ("CrVI") level as a function of Iron II (Fe II) dosage for several iron containing CrVI reducing additives.

The coordinated metal compounds as described herein may be used in any application wherein the objective is to reduce chromium VI into less harmful forms such as chromium III, but this is particularly desirable in cement applications, such as in the manufacturing of cement and its various uses, such as in mortars and concretes.

Metals for reducing chromium VI levels may be used in an amount of 10 to 10,000 parts per million (ppm) by weight of cement; and, more preferably, in an amount of 100-5000 ppm by weight of cement, and most preferably in an amount of 100-1000 ppm by weight of cement.

The preferred amount is, of course, dependent upon the actual levels of chromium VI to be treated. The coordinated metal compounds in which such metals are used may be in either a liquid (aqueous or non-aqueous) form, or in a dry particle (e.g., dried powder or granulated) form, depending on application and personal preference.

It is believed that a variety of chromium VI reducing metals, preferably in the form of salts or derivatives thereof (e.g., hydrates) may be employed in the invention. Exemplary metals in such form include: iron, tin, manganese, cobalt, nickel, scandium, titanium, nickel, copper, molybdenum, zirconium, and others. Preferred are the transition metals, although it is believed that tin II, in the form of stannous sulfate or tin chloride, may also be used to form the coordinated metal compounds.

Exemplary anions contemplated for use with the metals include sulfate, sulfide, chloride, bromide, nitrite, nitrate, oxalate, thiocyanate, phosphonate, carbonate, iodide, hydroxide, fluoride, acetate, gluconate, tartarate, citrate, and others.

The term "cement" as used herein means and refers to Portland cement, which, as used in the construction trade, means a hydratable cement produced by pulverizing or intergrinding cement clinker which consists of calcium silicates usually containing one or more of the forms of calcium sulfate as an interground addition with ASTM types I, II, III, IV, or V (or other types such as EN197). "Cementitious" materials are materials that alone have hydraulic or hydratable cementing properties in that they set and harden in the presence of water. Included in cementitious materials are ground granulated blast-furnace slag (although some air cooled slags may be deemed cementitious as well) and natural cement (e.g., ordinary Portland cement). "Cementitious" materials may also include gypsum (e.g., calcium sulfate hemihydrate), aluminous cement, ceramic cement, oil well drilling cement, and others.

The term "cement," as used in the present invention, may include pozzolans, which are siliceous or aluminosiliceous materials that possess little or no cementitious value (i.e., as a binder) but which will, in finely divided form in the presence of water, chemically react with the calcium hydroxide released by the hydration of Portland cement to form materials with cementitious properties. See e.g., Dodson, V., *Concrete Admixtures* (Van Nostrand Reinhold, N.Y. 1990), page 159. Diatomaceous earth, limestone, clay (e.g., metakaolin), shale, fly ash, silica fume, and blast furnace slag are some of the known pozzolans. Certain ground granulated blast-furnace slags and high calcium fly ashes possess both pozzolanic and cementitious properties.

Cementitious compositions prepared by processes of the invention thus comprise primarily cement made from cement clinker. Accordingly, such compositions preferably have at least 40% by weight of Portland cement, and more preferably at least 80% by weight.

In preferred methods of the invention wherein clinker is ground to produce cement, it is believed that any of the known grinding mill types may be employed, including ball mills and roll (or roller) mills. Mills having rolls (such as roll press mills) can be used wherein the cement clinker (or slag or fly ash) are crushed on circular tables upon which rollers are revolved. Other types of roller mills employ two or more rollers that are nipped together, and clinker or other cement, or cementitious precursors, are crushed by dropping materials vertically between nipped rollers. Thus, the methods and compositions of the invention can be used in both ball mills and roller mills that are used for grinding precursor materials (e.g., clinker) to produce hydratable cement particles.

The inventors discovered how to maintain the storage stability of a chromium VI reducing metal that is interground with clinker into hydratable cement. This is accomplished by first forming the coordinated metal compound, wherein at least two nitrogen containing moieties are bonded or associated with the same chromium VI reducing metal, thereby stabilizing the metal from oxidative attack by atmospheric oxygen and minimizing loss of efficiency due to adsorption on cement.

For example, such nitrogen-containing moieties can be provided in the form of Mohr's salt, which is ferrous ammonium sulfate ($FeSO_4.(NH_4)_2SO_4.6H_2O$), and similar coordination compounds having ammonium groups forming associations with the same metal cation. Such compounds may be denoted using the formula, $MeSO_4.(NH_4)_2SO_4.6H_2O$, wherein Me represents a transition metal in a lower oxidation state. Such compounds may include, without limitation, the following:

Ferrous ammonium sulfate ($FeSO_4.(NH_4)_2SO_4.6H_2O$)
Nickel ammonium sulfate ($NiSO_4.(NH_4)_2SO_4.6H_2O$)
Manganese ammonium sulfate ($MnSO_4.(NH_4)_2SO_4.6H_2O$)
Cobaltous ammonium sulfate ($CoSO_4.(NH_4)_2SO_4.6H_2O$)
Copper ammonium acetate The use of Mohr's salt, when compared to other coordination metal compound embodiments hereinafter described, may result in the treated cement having an unpleasant odor, but it may be possible to mask this odor.

In preferred embodiments of the invention, the at least two nitrogen moieties are amine groups which are spaced apart from and connected to each other by connection to or embodiment within the same molecular structure, such as in a $C_2$-$C_3$ alkyl group, or within one or more aromatic ring structures.

Such an exemplary coordinated metal compound suitable for use in the present invention is ethylenediamine metal salt, $C_2H_8N_2.MeSO_4.H_2SO_4.4H_2O$, wherein Me represents a chromium VI reducing metal (in a lower oxidation state). Another way of representing the coordinated metal compound is $R_n.MeX.mH_2O$ wherein R represents a polydentate polyamine having at least two amine groups for bonding with the same metal, "n" represents an integer of 1 to 3, Me represents a transition metal (in a lower oxidation state), and X represents an anion, and "m" represents an integer greater than or equal to zero.

Exemplary nitrogen containing molecules, which are operative to bond or associate with the same chromium VI reducing metal to form exemplary coordination metal compounds useful in the present invention, may be represented by the formula $^1NR^3R^4$-A-$^2NR^1R^2$ wherein $^1N$ and $^2N$ represent nitrogen atoms of the first and second amine groups, each having a pair of electrons for bonding or associating with the same chromium VI reducing metal. A represents a $C_2$ to $C_3$ alkyl group, and each of $R^1$, $R^2$ $R^3$, and $R^4$ may be selected from hydrogen, an alkyl group, —$CH_2CH_2OH$, acetate, and/or phophonomethyl derivatives thereof, as appropriate. For example, the nitrogen containing molecules may include N-hydroxyethylethylenediamine triacetic acid trisodium salt dehydrate or ethylene diamine tetracetic acid (EDTA) which are believed operative to bond or associate with the same chromium VI reducing metal.

Preferred coordinated metal compounds are those having polydentate polyamine groups having one, two, or more aromatic ring structures that are operative to present two nitrogen bonding or association sites for the same chromium VI reducing metal, particularly aromatic amines believed to form five- and six-member rings with the metal. These include, for example, 2,2'-bipyridine, in which two amine groups are spaced apart from each other because they are contained within two different aromatic rings spaced apart from and connected by a carbon-carbon bond. Another example is 1,10-phenanthroline, in which two amine groups are spaced apart from each other because they are contained within two different aromatic rings that are spaced apart by and connected by a third aromatic ring.

Exemplary amine containing coordinated metal compounds which are also believed to be suitable for forming bonds or associations with chromium VI reducing metal cations include terpyridine and diethylene triamine.

Examplary coordinated metal compounds of the invention which are suitable for forming polydentate polyamine metal compounds, therefore have at least two amine groups that are spaced apart from each other and connected through a $C_2$ to $C_3$ carbon chain, or, alternatively, aromatic ring structures, as in the case of 2,2'-bipyridine and 1,10-phenanthroline, as described above. It is also possible for the at least two amine groups to be separated from and connected to each other by both an alkyl chain and an aromatic ring structure.

As previously mentioned above, the coordinated metal compounds of the invention may also be combined with one or more cement additives and/or concrete admixtures, or mixtures thereof, before combining with the cement.

Thus, as described in the summary of the invention, exemplary compositions of the present invention comprise: (A) at least one coordinated metal compound wherein at least two nitrogen groups are spaced apart from each other and bonded to or associated with the same chromium VI reducing metal; and (B) at least one material selected from (i) a hydratable cement, (ii) at least one cement additive, (iii) at least one concrete admixture, or (d) a mixture or mixtures thereof.

As used herein the term "cement additive" is refers to a composition known for modifying a cement, such as during the intergrinding of cement clinker to produce Portland cement. The term "admixture" is used to refer to a composition that is combined with the finished (Portland) cement, with or without aggregates. For example, a "mortar admixture" is one that is added to cement and fine aggregate (sand), while a "concrete admixture" is one that is added to a combination of cement, fine aggregate (sand), and coarse aggregate (crushed gravel, stones). Thus, the present invention also provides additive and admixture compositions, as well as cement and cementitious compositions, having at least coordinated metal compound having at least two nitrogen containing moieties bonded or associated with the same chromium VI reducing metal.

Known cement additives may be used, for example, in an amount of 0.01-1.0% s/s cement, and these include, but are not limited to, tetrahydroxylethylethylene diamine ("THEED"), an alkanolamine such as triethanolamine ("TEA") or triisopropanolamine ("TIPA"), a glycol (such as diethylene glycol), or mixture thereof. THEED was described, along with similar derivatives of ethylene diamine, in French Patent Application No. FR2485949A1 as an agent for enhancing the strength of cement cured products, such as mortar and concrete, in which Portland cement, blended cement, etc., has been used.

Another exemplary additional cement additive contemplated for use in the present invention is poly(hydroxyalkylated) polyethyleneamine, poly(hydroxyethyl)polyethyleneimine, as disclosed in U.S. Pat. No. 4,401,472. The use of this additive in cement grinding or as admixtures in concrete, including hydraulic cement, aggregate, and water, would enhance strength. See also U.S. Pat. No. 5,084,103 (disclosing triisopropanolamine and other trialkanolamines used as strength enhancing additives for later age strength (7-28 days) in cement grinding); See also U.S. Pat. No. 6,290,772 (disclosing hydroxylamines including N,N-bis(2-hydroxyethyl)-2-propanolamine and N,N-bis(2-hydroxypropyl)-N-(hydroxyethyl)amine, to enhance compressive strength).

Other additional additives or admixtures can include known materials used for processing cement or modifying concretes or mortars, such as early compressive strength enhancers, grinding aids, set retarders, set accelerators, corrosion inhibiting agents, anti-foaming agents, air entraining ("AE") agents, water-reducing agents, AE/water-reducing agents, high-performance water-reducing agents (such as polycarboxylate comb polymers), high-performance AE water-reducing agents, fluidizers, agents to reduce segregation, set accelerators, antifreezing agents, cold-resisting agents, shrink reducing agents, heat of hydration inhibitors, and alkali aggregate reaction inhibitors.

Exemplary additional additives and admixtures may include an amine, alkanolamine, acrylic acid or salt thereof, glycol, glycerol, acetate salt, a phenol, chloride salt, sugar, or combination thereof. The amounts of such additives and/or admixtures can be used in accordance with conventional practice.

While the invention is described herein using a limited number of embodiments, these specific embodiments are not intended to limit the scope of the invention as otherwise described and claimed herein. Modification and variations from the described embodiments exist. More specifically, the following examples are given as specific illustrations of embodiments of the claimed invention. The invention is not limited to the specific details set forth in the examples. All parts and percentages in the examples, as well as in the remainder of the specification, are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% . . . 50%, 51%, 52%, . . . 95%, 96%, 97%, 98%, 99%, or 100%. Moreover, any numerical range represented by any two values of R, as calculated above, is also specifically disclosed.

Example 1

FIG. 1 shows results of cement clinker in which Mohr's salt in various forms (solid or in water solution) was added in comparison to ferrous sulfate. The Mohr salt additions were more effective than ferrous sulfate in reducing chromate in the resultant ground cement, especially when used in solution form. Dilute solutions are better than concentrated solutions, perhaps due to better dispersion. However, dilute solutions could result in caking due to excess water. It was found that adding sodium gluconate to the Mohr's salt at a 1:1 by mass addition rate facilitated a higher loading of the Mohr's salt at 50 to 75% solids levels, and this eliminated caking. Performance in the ball mill was better than the dry Mohr's salt. It was confirmed in all cases that the addition of a Mohr's salt solution was favorable when compared to adding powder for grinding operations.

Example 2

Figure 2:
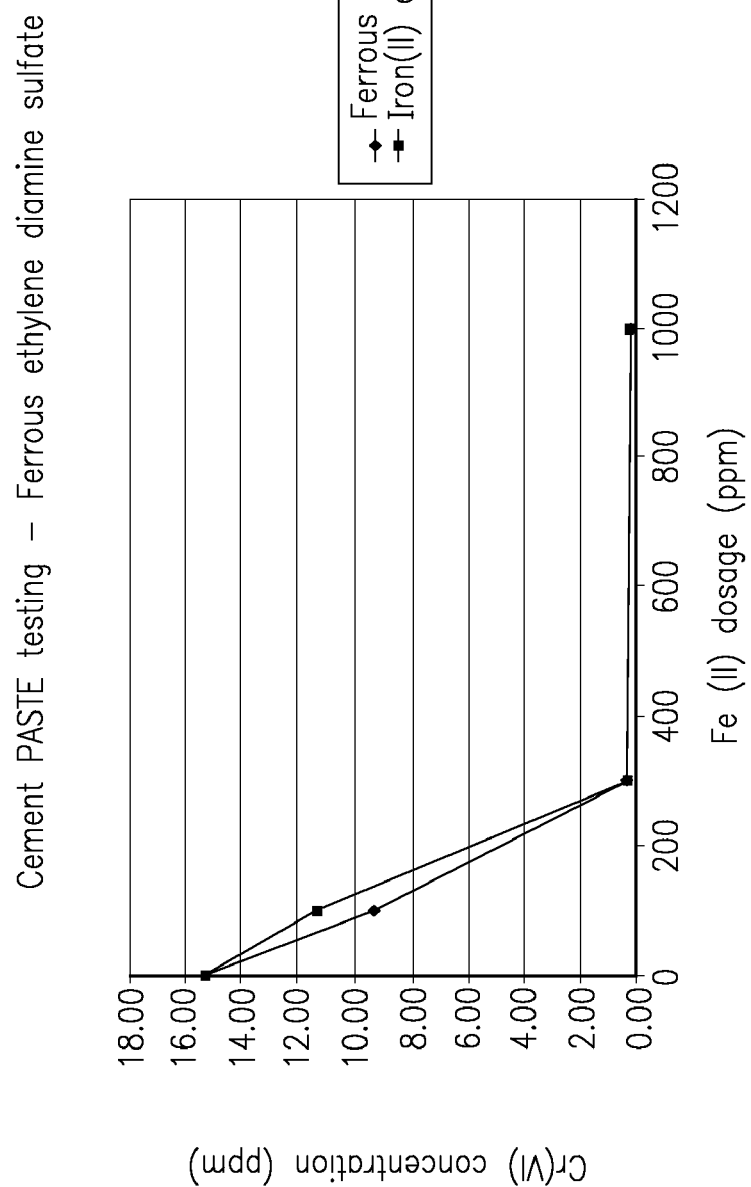
FIG. 2 is a graph of data showing that a preferred coordinated metal compound of the invention, namely, ethylenediamine ferrous sulfate, is extremely effective in reducing CrVI when added to cement pastes.

One major problem with Mohr's salt is the release of ammonia when water is added to the cement. This was quite noticeable in concrete, where 8 parts per million of ammonia was detected. In addition, the setting of the cement was retarded by more than two hours. Such disadvantages are believed to present significant hurdles in the industry. When the present inventors replaced the ammonia groups with the amine groups, e.g., substituting ethylenediamine ferrous sulfate tetrahydrate for ethylene diammonium ferrous sulfate, chromate levels were reduced in cement but ammonia gas was not produced. Initial results in paste mixes are presented in FIG. 2.

Example 3

Figure 3:
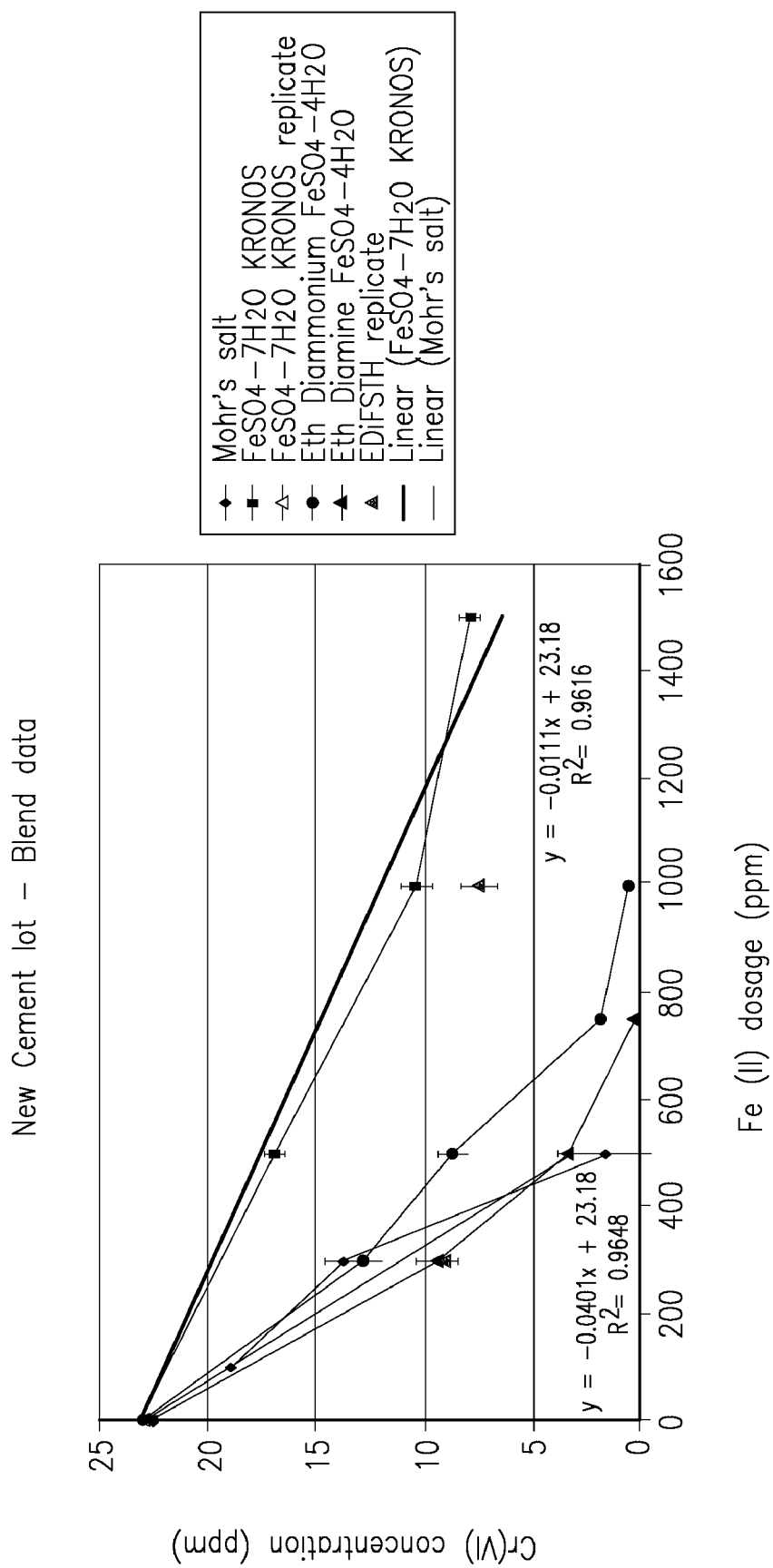
FIG. 3 is a graph of data showing that ethylenediamine ferrous sulfate and Mohr's salt significantly outperform ferrous sulfate heptahydrate in reducing CrVI in blended cements.

Test results take from blended cements in which Mohr's salt, ethylene diamine salts, and ferrous sulfates were compared, are presented in FIG. 3. The performance enhancement with the ethylene diamine ferrous sulfate was equivalent to Mohr's salt without the ammonia odor, and both significantly outperformed the standard $FeSO_4*7H_2O$.

Example 4

Figure 4:
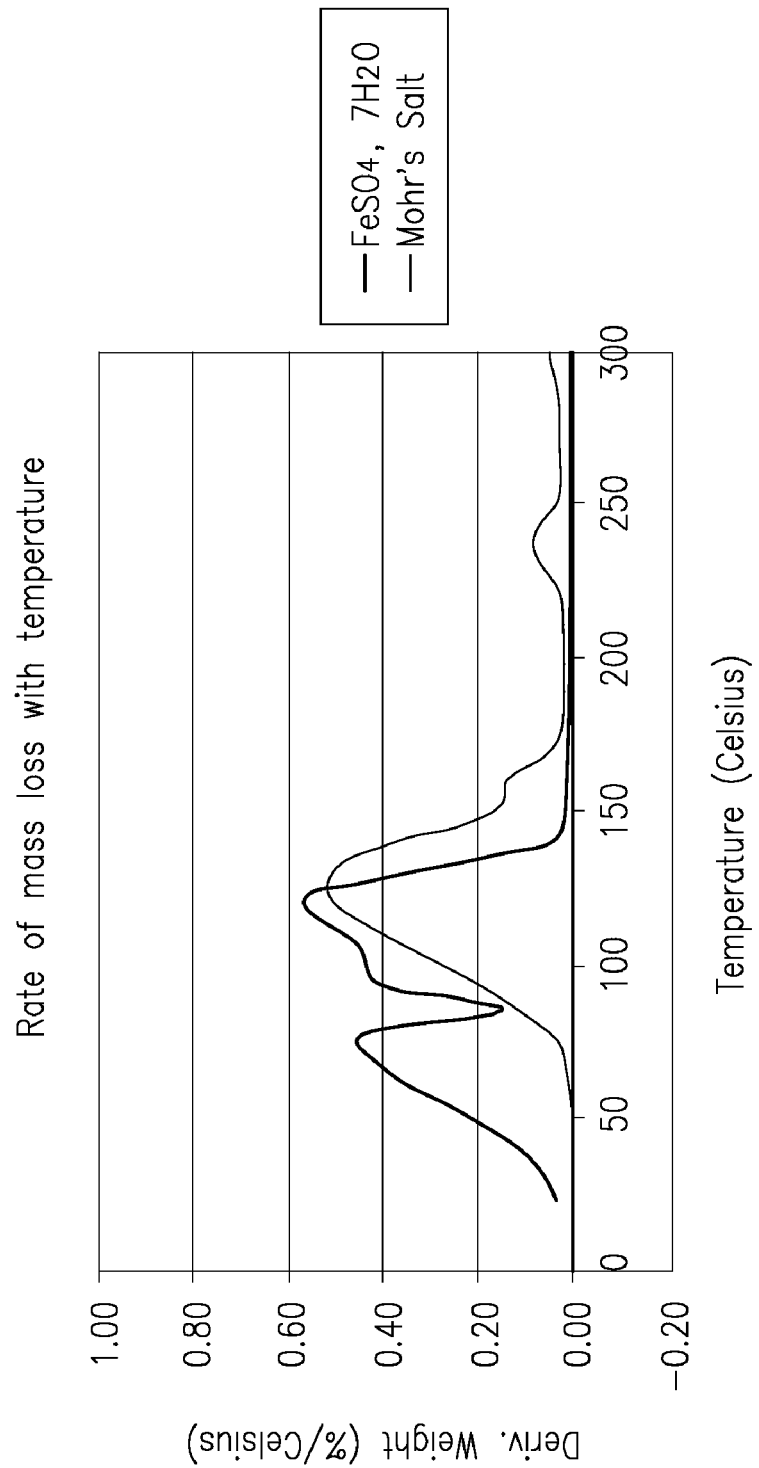
FIG. 4 is a graph of data showing that Mohr's salt is more stable than ferrous sulfate heptahydrate (lower rate of mass loss)
Figure 5:
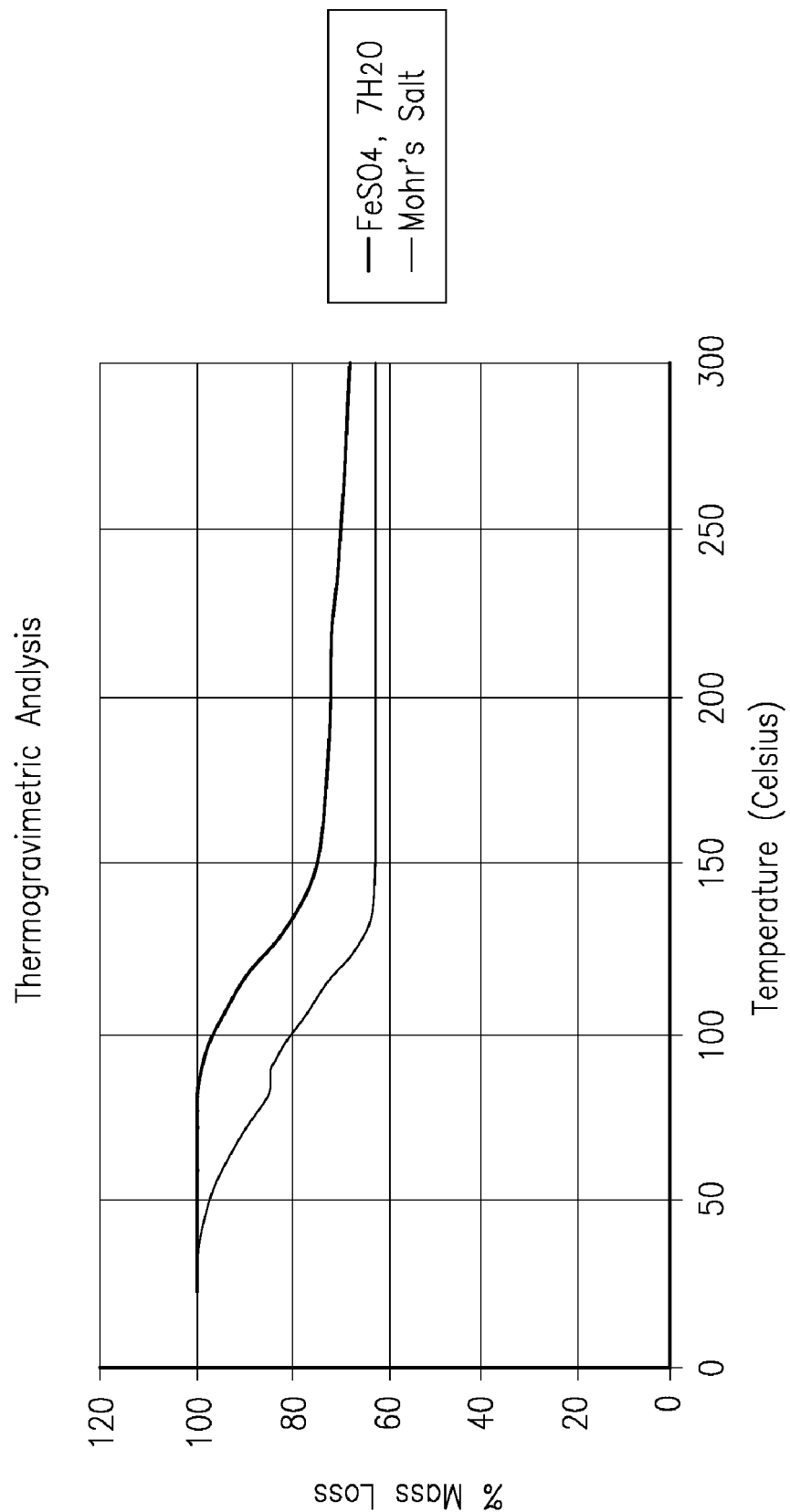
FIG. 5 is a graph of thermogravimetric data illustrating that Mohr's salt has less mass loss than ferrous sulfate heptahydrate, and it occurs at higher temperatures, and is thus more stable.

The enhanced performance of Mohr's salt and ethylene diamine ferrous sulfate compared to ferrous sulfate is believed to be partially due to increased stability of these materials. FIGS. 4 and 5 illustrate thermogravimetric data for Mohr's salt compared data for ferrous sulfate heptahydrate. The breakdown for Mohr's salt occurs at a higher temperature, and suggests that it is much less stable. It is believed that ethylene diamine ferrous sulfate and other polydentate polyamine metal compounds have equal or better stability when compared to ferrous sulfate heptahydrate.

The foregoing illustrations and examples are provided for illustrative purposes only and not intended to limit the scope of the invention.

We claim:

1. A method for reducing hexavalent chromium in cementious compositions, comprising: introducing into an environment, having chromium VI, a coordinated metal compound wherein at least two nitrogen-containing moieties are coordinated with the same chromium VI reducing metal cation.

2. The method of claim 1 wherein said environment having chromium VI is hydratable cement.

3. The method of claim 2 wherein said coordinated metal compound comprises a molecular structure wherein said at least two nitrogen containing moieties are spaced apart by an alkyl group, at least one aromatic ring structure, or a mixture thereof.

4. The method of claim 3 wherein said coordinated metal compound is represented by the formula $MeSO_4.(NH_4)_2SO_4.6H_2O$ wherein Me represents a transition metal in a lower oxidation state.

5. The method of claim 4 wherein said coordinated metal compound is Mohr's salt.

6. The method of claim 3 wherein said coordinated metal compound is represented by the formula $R_n \cdot MeX \cdot mH_2O$ wherein R represents a polydentate polyamine having at least two amine groups for bonding with the same metal, "n" represents an integer of 1 to 3, Me represents a transition metal in a lower oxidation state, X represents an anion, and "m" represents an integer greater than or equal to zero.

7. The method of claim 6 wherein R represents a $C_2$-$C_3$ alkyl group.

8. The method of claim 7 wherein said coordinated metal compound is ethylenediamine ferrous sulfate.

9. The method of claim 2 wherein said coordinated metal compound is formed by bonding or associated a chromium VI reducing metal with a molecule having the formula $^1NR^3R^4$-A-$^2NR^1R^2$ wherein $^1N$ and $^2N$ represent nitrogen atoms of said first and second amine groups, each having a pair of electrons for bonding or associating with the same chromium VI reducing metal, A represents a $C_2$ to $C_3$ alkyl group, and each of $R^1$, $R^2$, $R^3$, and $R^4$ may be selected from hydrogen, an alkyl group, —$CH_2CH_2OH$, acetate, and/or phosphonomethyl derivatives thereof.

10. The method of claim 3 wherein said coordinated metal compound contains at least one aromatic ring.

11. The method of claim 10 wherein said coordinated metal compound comprises bipyridine, phenanthroline, or mixture thereof.

12. The method of claim 1 wherein said metal cation is selected from the group consisting of iron, tin, manganese, cobalt, nickel, scandium, titanium, nickel, copper, molybdenum, and zirconium.

13. The method of claim 1 wherein said coordinated metal compound is used in the amount of 100-5000 parts per million based on weight of cement.

14. The method of claim 2 wherein said environment is the manufacturing process wherein cement clinker is interground to produce cement.

15. A composition provided by the method of claim 1.

* * * * *